(12) United States Patent
Gumpoltsberger et al.

(10) Patent No.: US 8,251,859 B2
(45) Date of Patent: *Aug. 28, 2012

(54) MULTI STEP TRANSMISSION

(75) Inventors: Gerhard Gumpoltsberger, Friedrichshafen (DE); Christian Sibla, Friedrichshafen (DE); Stefan Beck, Eriskirch (DE); Josef Haupt, Tettnang (DE); Gert Bauknecht, Friedrichshafen (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 64 days.

This patent is subject to a terminal disclaimer.

(21) Appl. No.: 12/859,401

(22) Filed: Aug. 19, 2010

(65) Prior Publication Data

US 2011/0045936 A1 Feb. 24, 2011

(30) Foreign Application Priority Data

Aug. 20, 2009 (DE) .......................... 10 2009 028 710

(51) Int. Cl.
*F16H 3/44* (2006.01)

(52) U.S. Cl. ......... 475/284; 475/269; 475/275; 475/278

(58) Field of Classification Search .................. 475/269, 475/275, 278, 284
See application file for complete search history.

(56) References Cited

U.S. PATENT DOCUMENTS

| | | |
|---|---|---|
| 4,395,925 A | 8/1983 | Gaus |
| 4,683,776 A | 8/1987 | Klemen |
| 5,106,352 A | 4/1992 | Lepelletier |
| 6,558,287 B2 | 5/2003 | Hayabuchi et al. |
| 6,572,507 B1 | 6/2003 | Korkmaz et al. |
| 6,634,980 B1 | 10/2003 | Ziemer |
| 6,860,831 B2 | 3/2005 | Ziemer |
| 6,955,627 B2 | 10/2005 | Thomas et al. |
| 6,960,149 B2 | 11/2005 | Ziemer |
| 6,991,578 B2 | 1/2006 | Ziemer |
| 7,549,942 B2 | 6/2009 | Gumpoltsberger |
| 7,556,582 B2 | 7/2009 | Gumpoltsberger |
| 7,566,283 B2 | 7/2009 | Gumpoltsberger |

(Continued)

FOREIGN PATENT DOCUMENTS

DE 26 36 969 A1 2/1978

(Continued)

OTHER PUBLICATIONS

Gumpoltsberger, Gehard: Systematische Synthese und Bewertung von mehrgangigen Planetengetrieben. Dissertation, TU Chemnitz, 2007 das ges. Dokument, insbes, Kap 1.2.

(Continued)

*Primary Examiner* — David D Le
*Assistant Examiner* — Colby M Hansen
(74) *Attorney, Agent, or Firm* — Davis & Bujold, P.L.L.C.

(57) ABSTRACT

A multi step transmission, of a planetary design, which has an external housing and includes a transmission input shaft and a transmission output shaft. First, second, third and fourth planetary gear sets are each accommodated within the transmission housing along with third, fourth, fifth, sixth, seventh and eighth shafts, and at least six shift elements. The at least six shift elements comprises first and second brakes and first, second, third and fourth clutches, whose selected engagement produces different transmission ratios between the drive shaft and the output shaft such that nine separate forward gears and one reverse gear can be achieved. For each of the forward and reverse gears, only three of the six shift elements are engaged.

6 Claims, 2 Drawing Sheets

U.S. PATENT DOCUMENTS

| | | | |
|---|---|---|---|
| 7,632,206 B2 * | 12/2009 | Gumpoltsberger | 475/275 |
| 7,699,743 B2 | 4/2010 | Diosi et al. | |
| 7,909,726 B2 * | 3/2011 | Phillips et al. | 475/282 |
| 7,988,586 B2 * | 8/2011 | Phillips et al. | 475/275 |
| 2008/0161149 A1 | 7/2008 | Diosi et al. | |
| 2008/0261756 A1 | 10/2008 | Carey et al. | |
| 2009/0011891 A1 | 1/2009 | Phillips et al. | |
| 2009/0048059 A1 | 2/2009 | Phillips et al. | |
| 2010/0048344 A1 | 2/2010 | Kamm et al. | |
| 2011/0009228 A1 | 1/2011 | Bauknecht et al. | |
| 2011/0045937 A1 * | 2/2011 | Gumpoltsberger et al. | 475/275 |
| 2011/0045938 A1 * | 2/2011 | Gumpoltsberger et al. | 475/275 |
| 2011/0045939 A1 * | 2/2011 | Gumpoltsberger et al. | 475/275 |
| 2011/0045940 A1 * | 2/2011 | Gumpoltsberger et al. | 475/275 |
| 2011/0045941 A1 * | 2/2011 | Gumpoltsberger et al. | 475/275 |
| 2011/0045942 A1 * | 2/2011 | Gumpoltsberger et al. | 475/275 |
| 2011/0045943 A1 * | 2/2011 | Gumpoltsberger et al. | 475/275 |

FOREIGN PATENT DOCUMENTS

| | | |
|---|---|---|
| DE | 29 36 969 A1 | 4/1981 |
| DE | 199 12 480 A1 | 9/2000 |
| DE | 199 49 507 A1 | 4/2001 |
| DE | 101 15 983 A1 | 10/2002 |
| DE | 101 15 987 A1 | 10/2002 |
| DE | 101 15 995 A1 | 10/2002 |
| DE | 102 13 820 A1 | 10/2002 |
| DE | 10 2005 010 837 A1 | 9/2005 |
| DE | 10 2004 040 597 A1 | 2/2006 |
| DE | 10 2005 002 337 A1 | 8/2006 |
| DE | 10 2005 010 210 A1 | 9/2006 |
| DE | 10 2005 032 881 A1 | 1/2007 |
| DE | 10 2006 006 622 A1 | 9/2007 |
| DE | 10 2006 006 636 A1 | 9/2007 |
| DE | 10 2006 006 637 A1 | 9/2007 |
| DE | 10 2008 000 428 | 2/2008 |
| DE | 10 2008 007 574 A1 | 8/2008 |
| DE | 10 2008 016 084 A1 | 10/2008 |
| DE | 10 2008 016 084 A1 | 10/2008 |
| DE | 10 2008 000 428 A1 | 9/2009 |
| EP | 0 434 525 A1 | 6/1991 |
| JP | 2005 036955 A | 2/2005 |
| JP | 2005061445 A | 3/2005 |
| JP | 2006-349153 A | 12/2006 |
| JP | 2006349153 A | 12/2006 |
| WO | 2009/106408 A1 | 9/2009 |

OTHER PUBLICATIONS

Gumpoltsberger, Gerhard: Systematic Synthesis and Evaluation of Multi-Stage Planetary Transmissions, Dissertation TU Chemnitz, 2007.

Gumpoltsberger, Gerhard: Synthesis of Planetary Transmissions, ZF Friedrichshafen AG, 2009, 13 pages, Germany.

* cited by examiner

|  | 03 | 04 | 13 | 17 | 28 | 35 | i | phi |
|---|---|---|---|---|---|---|---|---|
| 1. GEAR |  | X |  |  | X | X | 5.903 | 1.793 |
| 2. GEAR |  |  | X |  | X | X | 3.292 | 1.503 |
| 3. GEAR |  | X | X |  | X |  | 2.190 | 1.407 |
| 4. GEAR |  | X |  | X | X |  | 1.557 | 1.305 |
| 5. GEAR |  | X | X | X |  |  | 1.193 | 1.193 |
| 6. GEAR |  |  | X | X |  | X | 1.000 | 1.142 |
| 7. GEAR |  | X |  | X |  | X | 0.876 | 1.157 |
| 8. GEAR | X |  |  | X |  | X | 0.757 | 1.154 |
| 9. GEAR | X | X |  | X |  |  | 0.656 | 9.001 |
| R GEAR | X | X |  |  | X |  | -5.187 | -0.879 |

Fig. 3

MULTI STEP TRANSMISSION

This application claims priority from German patent application serial no. 10 2009 028 710.8 filed Aug. 20, 2009.

FIELD OF THE INVENTION

The present invention relates to a multi step transmission of a planetary design, in particular an automatic transmission for a motor vehicle.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch.

Such an automatic transmission is known, for example, from the applicant's DE 199 49 507 A1, according to which two non-shiftable front-mounted gear sets are provided on the drive shaft and generate two rotational speeds on the output side, which, in addition to the rotational speed of the drive shaft, can be selectively meshed with a shiftable double planetary gear set acting on the output shaft by selective engagement of the shift elements such that only one of the two currently actuated shift elements must be engaged or disengaged to shift from one gear to the next higher or lower gear.

By using five shift elements, seven forward gears are obtained; by using six shift elements, nine or ten forward gears are obtained.

Furthermore, a multi step automatic transmission with eight forward gears and one reverse gear is known from DE 102 13 820 A1, and it comprises a first input path T1 of the first transmission ratio; an input path T2, which features a larger transmission ratio than the input path T1; a planetary gear set of the Ravigneaux type with four elements, wherein the four elements are placed as a succession of elements in a rotational speed diagram as a first element, a second element, a third element and a fourth element: a clutch C-2, which transfers the torque of the input path T2 to the first element S3; a clutch C-1, which transfers the torque of the input path T2 to the fourth element S2; a clutch C-4, which transfers the torque of the input path T1 to the first element; a clutch C-3, which transfers the torque of the input path T1 to the second element C3; a brake B-1, which produces the mesh of the fourth element; a brake B-2, which produces the mesh of the second element; and a drive element, which is coupled with the third element S3.

Furthermore, a nine-speed multi step transmission is known from DE 29 36 969 A1; it comprises eight shift elements and four gear sets, wherein one gear set serves as a front-mounted gear set and the main gearing features a Simpson set and a further gear set serving as reverse gearing.

Additional multi step transmissions are for example known from the applicant's DE 102005010210 A1 and DE 102006006637 A1.

Automatically shiftable vehicle transmissions of planetary design, are already generally described numerous times in the prior art and are continually undergoing further development and improvement. These transmissions should have a relatively simple design, in particular requiring a low number of shift elements, and avoid the need for double shifting when sequential shifting is performed, thereby ensuring that only one shift element is ever switched when shifting is performed in defined groups of gears.

The applicant's document, DE 102008000428.3, which is not yet published, discloses a multi step transmission of a planetary design that includes an input shaft and an output shaft which are arranged in a housing. The known transmission includes at least four planetary gear sets which are designated, in the following, as the first, second, third, and fourth planetary gear set, at least eight rotatable shafts which are designated in the following as the drive shaft, output shaft, third, fourth, fifth, sixth, seventh, and eighth shaft, and at least six shift elements comprising brakes and clutches, whose selective engagement produces different transmission ratios between the input shaft and the output shaft, and therefore preferably nine forward gears and one reverse gear are feasible.

The first and second planetary gear sets, which are preferably designed as minus planetary gear sets, form a shiftable front-mounted gear set, wherein the third and fourth planetary gear sets form a main gear set.

In the known multi step transmission, the carriers of the first and second planetary gear sets are coupled together via the fourth shaft, which is connected to an element of the main gear set, the ring gear of the first planetary gear set is coupled to the sun gear of the second planetary gear set via the eighth shaft, which is detachably connectable to the drive shaft via the first clutch, and the sun gear of the first planetary gear set can be coupled to a transmission housing by means of the third shaft, via a first brake, and is detachably connectable to the drive shaft via a second clutch, wherein the ring gear of the second planetary gear set can be coupled to a transmission housing by means of the fifth shaft via a second brake. In addition, the seventh shaft is constantly connected to at least one element of the main gear set, and can be coupled to a transmission housing via a third brake, wherein the sixth shaft is constantly connected to at least one further element of the main gear set and is detachably connectable to the drive shaft, via a third clutch; the output shaft is constantly connected at least to one further element of the main gear set.

In the known transmission, the fourth shaft is preferably constantly connected to the ring gear of the third planetary gear set, the sixth shaft is constantly connected to the ring gear of the fourth planetary gear set and to the carrier of the third planetary gear set, and is detachably connectable to the drive shaft via the third clutch. Furthermore, the seventh shaft is constantly connected to the sun gears of the third and fourth planetary gear sets, and can be coupled to a transmission housing via the third brake. In this case, the output drive is produced via the output shaft that is constantly connected to the carrier of the fourth planetary gear set. Furthermore, the third and fourth planetary gear sets can be combined or reduced to a Ravigneaux set having a common carrier and a common ring gear.

SUMMARY OF THE INVENTION

The objective of the present invention is to propose a multi step transmission of the initially described type, which has nine forward gears and at least one reverse gear having a sufficient transmission ratio, in which the design complexity and the overall size, in particular the overall length and the weight, are optimized, and in which efficiency is improved with respect to drag losses and gearing losses. In addition, in the multi step transmission according to the invention, minimal support moments should be exerted on the shift elements.

According to the invention, the transmission should be particularly suited for a front transverse construction.

Accordingly, a multi step transmission, according to the invention, of a planetary design is proposed, which has an input shaft and an output shaft, which are arranged in a housing. In addition, there are provided at least four planetary gear sets which are designated, in the following, as the first, second, third, and fourth planetary gear set, eight rotatable shafts which are designated, in the following, as the drive shaft, output shaft, third, fourth, fifth, sixth, seventh, and eighth shaft, and at least six shift elements comprising brakes and clutches, whose selective engagement produces different transmission ratios between the drive shaft and the output shaft, and thus preferably nine forward gears and one reverse gear are feasible.

The planetary gear sets, viewed axially, are arranged in the sequence of first planetary gear set, second planetary gear set, third planetary gear set, fourth planetary gear set, and are preferably designed as minus planetary gear sets.

As is well known, a simple minus planetary gear set comprises a sun gear, a ring gear, and a carrier on which the planetary gears are rotatably supported, the planetary gears meshing with the sun gear and the ring gear. As a result, when the carrier is held in place, the ring gear has a direction of rotation that is opposite to that of the sun gear. In contrast, a simple plus planetary gear set comprises a sun gear, a ring gear and a carrier, on which inner and outer planetary gears are rotatably supported, wherein all inner planetary gears mesh with the sun gear and all outer planetary gears mesh with the ring gear, wherein each inner planetary gear meshes with only one outer planetary gear. As a result, when the carrier is held in place, the ring gear has the same rotational direction as the sun gear.

According to the preferable embodiment of the invention, the sun gear of the first planetary gear set is connected to the drive shaft, the carrier of the first planetary gear set is connected to the third shaft, which can be coupled to the transmission housing via a first brake, detachably connectable, via the second clutch, to the fifth shaft, the fifth shaft is connected to the ring gear of the second planetary gear set, the sun gear of the third planetary gear set and the sun gear of the fourth planetary gear set, and the drive shaft is detachably connected to the carrier of the fourth planetary gear set via the seventh shaft, which is connected to the carrier of the fourth planetary gear set, and via a third clutch detachably connecting the seventh shaft to the drive shaft.

In addition, the ring gear of the first planetary gear set is connected to the sixth shaft, which is connected to the carrier of the second planetary gear set, the ring gear of the third planetary gear set is coupled to a transmission housing, the sun gear of the second planetary gear set is connected to the fourth shaft, which can be coupled with a transmission housing via a second brake, and the drive shaft is connected to the ring gear of the fourth planetary gear set and is detachably connectable to the eighth shaft, which is connected to the carrier of the third planetary gear set via a fourth clutch.

Thereby it is provided that the first planetary gear set is blocked by the engagement of a first clutch, wherein the first clutch is preferably designed as clutch, which detachably connects the third shaft to the drive shaft, or it is designed as clutch, which detachably connects the third shaft to the sixth shaft.

The embodiment of the multi step transmission, according to the invention, results in transmission ratios that are particularly suitable for passenger vehicles, and have a greater overall gear ratio, thereby improving driving smoothness and significantly reducing fuel consumption.

Furthermore, construction expenditure is significantly reduced with the multi step transmission, according to the invention, due to a small number of shift elements. According to the invention, the multi step transmission offers the advantage of performing a start-up with a hydrodynamic converter, an external start-up clutch, or even with other suitable external start-up elements. It is also conceivable to perform the start-up using a start-up element integrated into the transmission. Preferably, a shift element that is actuated in the first forward gear and in the reverse gear is suitable.

Moreover, the multi step transmission, according to the invention, results in good efficiency in the main drive gears with respect to drag losses and gearing losses.

Furthermore, low moments occur in the shift elements and in the planetary gear sets of the multi step transmission, thereby advantageously reducing wear in the multi step transmission. In addition, the low moments make it possible to utilize correspondingly low dimensions, thereby reducing the necessary installation space and related costs. Furthermore, the rotational speeds of the shafts, shift elements, and planetary gear sets are low.

In addition, the transmission, according to the invention, is designed to allow adaptability to different drive train embodiments in terms of power flow direction and spatial aspects.

BRIEF DESCRIPTION OF THE DRAWINGS

The invention is described in greater detail in the following examples, supported by the attached figures. They show:

FIG. 3: an example of a shift schematics for a multi step transmission according to FIG. 1.

DETAILED DESCRIPTION OF THE PREFERRED EMBODIMENTS

Figure 1:
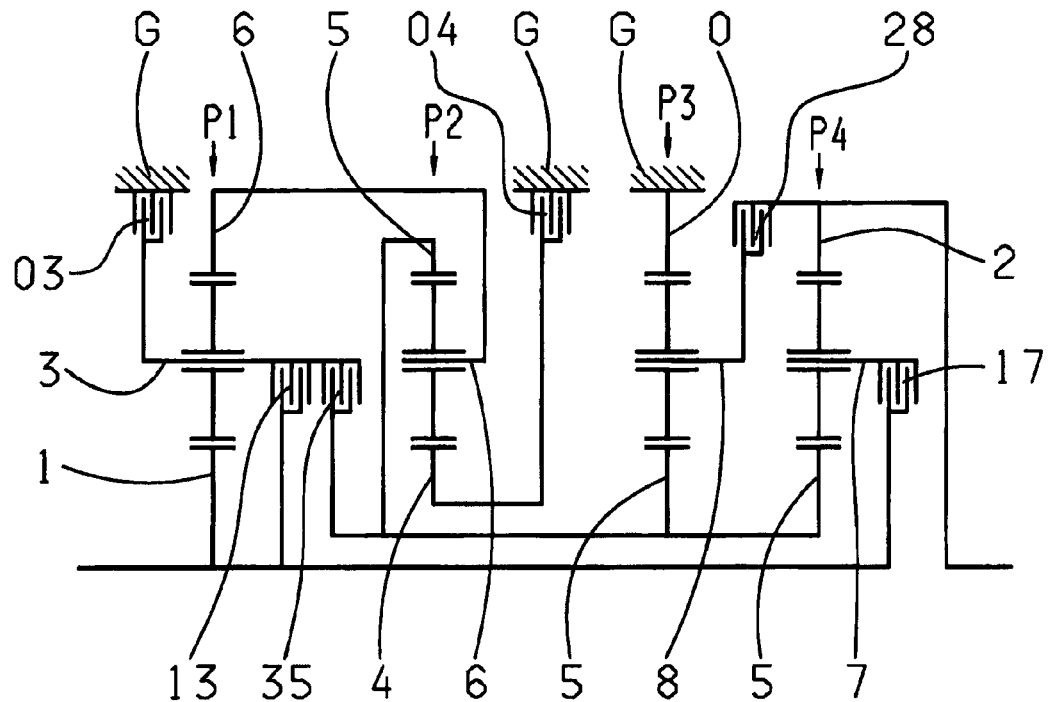
FIG. 1: a schematic view of a first preferred embodiment of a multi step transmission according to the invention.

FIG. 1 shows a multi step transmission, according to the invention, which has a drive shaft 1, an output shaft 2, and four planetary gear sets P1, P2, P3 and P4 which are arranged in a housing G. Planetary gear sets P1, P2, P3 and P4, in the example shown in FIG. 1, are designed as minus planetary gear sets. According to the invention, at least one planetary gear set can be implemented as a plus planetary gear set, if the carrier and ring gear connection are exchanged and, simultaneously, the value of the stationary transmission ratio is increased by 1 in comparison to the embodiment as a minus planetary gear set.

In the embodiment shown, the planetary gear sets, viewed axially, are arranged in the sequence P1, P2, P3 and P4.

As depicted in FIG. 1, six shift elements are provided, namely, two brakes, 03, 04, and four clutches 13, 17, 28 and 35. The spatial disposition of the shift elements can be arbitrary, and is limited only by the dimensions of the outer design. The clutches and the brakes of the transmission are preferably implemented as friction shift elements or lamellar shift elements.

Selective shifting of nine forward gears and one reverse gear can be realized using these shift elements. The multi step transmission, according to the invention, has a total of eight rotatable shafts, namely, the shafts 1, 2, 3, 4, 5, 6, 7 and 8, wherein the drive shaft is the first shaft, and the output shaft is the second shaft of the transmission.

The multi step transmission, according to the invention, as shown in FIG. 1, provides that the sun gear of the first planetary gear set P1 is connected to the drive shaft 1, wherein the carrier of the first planetary gear set P1 is connected to the third shaft 3, which can be coupled to the transmission housing G via a first brake 03, is detachably connectable to the drive shaft 1 via the first clutch 13 and to the fifth shaft 5 via a second clutch 35. The engagement of the first clutch 13 makes it possible to block the first planetary gear set P1 by coupling of the sun gear with the carrier.

As depicted in FIG. 1, the fifth shaft 5 is connected to the ring gear of the second planetary gear set P2, the sun gear of the third planetary gear set P3 and the sun gear of the fourth planetary gear set P4, wherein the drive shaft 1 is detachably connectable to the carrier of the fourth planetary gear set, via the seventh shaft 7 connected to the carrier of the fourth planetary gear set P4 and via the third clutch 17 detachably connecting the seventh shaft 7 to the drive shaft 1.

According to the invention, the ring gear of the first planetary gear set P1 is connected to the sixth shaft 6, which is connected to the carrier of the second planetary gear set P2, wherein the ring gear of the third planetary gear set P3 is coupled to the transmission housing G (shaft 0), and wherein the sun gear of the second planetary gear set P2 is connected to the fourth shaft 4, which can be coupled to the transmission housing G via the second brake 04; the output shaft 2 in the embodiment example shown, is detachably connectable, via a fourth clutch 28, to the eighth shaft 8, which is connected to the carrier of the third planetary gear set P3, and directly connected to the ring gear of the fourth planetary gear set P4.

According to the invention, the first clutch 13 and the second clutch 35, viewed axially, can be aligned between the first and the second planetary gear sets P1, P2, and the third clutch 17, viewed axially in the direction of the power flow in traction mode, can be aligned after the fourth planetary gear set P4. The fourth clutch 28, viewed axially, is preferably aligned between the third and fourth planetary gear sets P3, P4.

Figure 2:
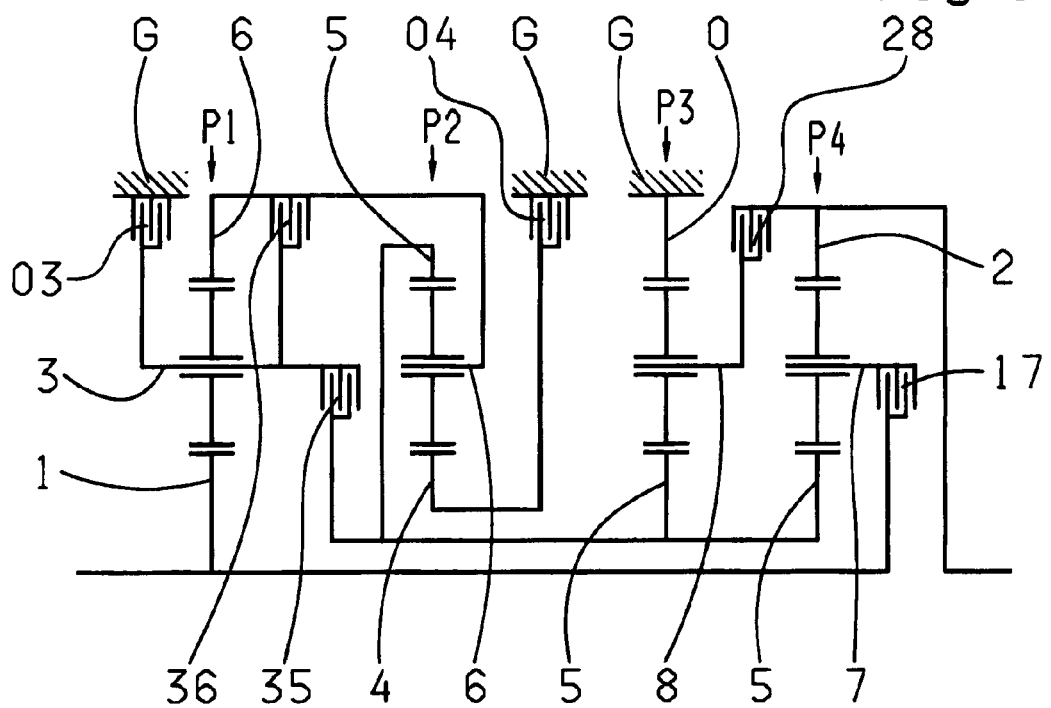
FIG. 2: a schematic view of a second preferred embodiment of a multi step transmission according to the invention.

The design example shown in FIG. 2 differs from the design example per FIG. 1 by the fact, that the first clutch is designed as clutch 36, via which the third shaft 3 is detachably connectable to the sixth shaft 6, so that blocking of the first planetary gear set P1 can be performed by coupling the carrier of the first planetary gear set P1 with the ring gear of the first planetary gear set P1.

FIG. 3 shows an example of a shift pattern of a multi step transmission according to FIG. 1. Three shift elements are engaged for every gear. The shift schematics shows, in the way of examples, the particular transmission ratios i of the individual gear steps, and, to be determined therefrom, the gear increments or step changes phi to the next higher gear, wherein the value 9.001 is the transmission ratio spread.

Typical values for the stationary transmission ratios of the planetary gear sets P1, P2, P3 and P4 implemented as minus planetary gear sets are: −1.953, −2.191, −2.235 and −2.404, respectively. FIG. 3 shows that double shifting or group shifting is avoided when shifting sequentially since two adjacent gear steps share two shift elements. It is also shown that a large transmission ratio spread is attained with small gear increments.

The first forward gear is attained by engaging the second brake 04 and the second and fourth clutches 35, 28; the second forward gear is attained by engaging the first, second and fourth clutch 13, 35, 28; the third forward gear is attained by engaging the second brake 04 and the first and fourth clutch 13, 28; the fourth forward gear is attained by engaging the second brake 04 and the third and fourth clutches 17, 28; the fifth forward gear is attained by engaging the second brake 04 and first and third clutches 13, 17; the sixth forward gear, preferably designed as the direct gear, is attained by engaging the first, second and third clutches 13, 35, 17; the seventh forward gear is attained by engaging the second brake 04 and the second and third clutches 35, 17; the eighth forward gear is attained by engaging the first brake 03 and the second and third clutches 35, 17, and the ninth forward gear is attained by engaging the first and second brakes 03, 04 and the third clutch 17; wherein the reverse gear is attained by engaging the first and second brakes 03, 04 and the fourth clutch 28.

Since the second brake 04 and the fourth clutch 28 are engaged in the first forward gear and in the first reverse gear, these shift elements can be used as start-up elements.

In the instance that according to the design example per FIG. 2, the first clutch is designed as clutch 36, via which the third shaft 3 is detachably connectable to the sixth shaft 6, the resulting gears can be attained according to the shift schematics per FIG. 3, with the difference that the reference character 36 replaces reference character 13.

According to the invention, different gear increments can also result from the same gear schematics depending on the shift logic, thereby making it possible to realize an application-specific or vehicle-specific variation.

According to the invention, it is possible to provide additional freewheels at each suitable location of the multi step transmission, for example, between a shaft and the housing, or possibly to connect two shafts.

According to the invention, an axle differential and/or a distributor differential can be disposed on the drive side or on the output side.

Within the scope of an advantageous development, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch can be used as the clutch element. It is also possible to dispose such a start-up element in the power flow direction after the transmission wherein, in this case, the drive shaft 1 is continuously connected to the crankshaft of the engine.

The multi step transmission, according to the invention, also makes it possible to situate a torsional-vibration damper between the engine and the transmission.

Within the scope of a further, not represented embodiment of the invention, a wear-free brake, for instance, a hydraulic or electric retarder or the like, can be disposed on each shaft, preferably on the drive shaft 1 or the output shaft 2, which is of special significance for use in commercial vehicles in particular. Furthermore, a power take-off drive can be provided on each shaft, preferably on the drive shaft 1 or the output shaft 2, for driving additional assemblies.

The friction shift elements that are used can be designed as power shiftable clutches or brakes. In particular, force locking clutches or brakes can be used, for instance, lamellar clutches, band brakes, and/or cone clutches.

A further advantage of the multi step transmission presented here is that an electric machine can be attached to each shaft as a generator and/or as an additional drive machine.

Obviously, any structural embodiment, in particular any spatial disposition of the planetary gear sets and the shift elements individually and relative to each other, and insofar as it is technically expedient, falls under the scope of protection of the present claims, without influencing the function of the transmission as specified in the claims, even if these embodiments are not explicitly represented in the figures or in the description.

REFERENCE CHARACTERS 1 first shaft, drive shaft
2 second shaft, output shaft
3 third shaft
4 fourth shaft
5 fifth shaft
6 sixth shaft
7 seventh shaft
8 eighth shaft
03 first brake
04 second brake
13, 36 first clutch
17 third clutch
28 fourth clutch
35 second clutch
P1 first planetary gear set
P2 second planetary gear set
P3 third planetary gear set
P4 fourth planetary gear set
i transmission ratio
phi step change
G housing

The invention claimed is:

1. A multi step transmission of a planetary design for an automatic transmission for a motor vehicle, the multi-step transmission comprising:
a drive shaft (1);
an output shaft (2);
first, second, third and fourth planetary gear sets (P1, P2, P3, P4) which are arranged within a housing (G); and
a rotatable third shaft (3), a rotatable fourth shaft (4), a rotatable fifth shaft (5), a rotatable sixth shaft (6), a rotatable seventh shaft (7) and a rotatable eighth shaft (8) as well as at least six shift elements (03, 04, 13, 17, 28, 35, 36) comprising first and second brakes (03, 04) and first, second, third and fourth clutches (13, 17, 28, 35, 36) whose selective engagement produces different transmission ratios, between the drive shaft (1) and the output shaft (2), so that nine forward gears and a reverse gear can be achieved;
wherein a sun gear of the first planetary gear set (P1) is continuously connected to the drive shaft (1);
a carrier of the first planetary gear set (P1) is connected to the third shaft (3) which is releasably directly connectable to the housing (G) via the first brake (03), and the third shaft (3) is releasably connectable to the fifth shaft (5) via the second clutch (35),
the fifth shaft (5) is connected to a ring gear of the second planetary gear set (P2), a sun gear of the third planetary gear set (P3) and a sun gear of the fourth planetary gear set (P4);
the drive shaft (1) is releasably connectable, via the third clutch (17), to the seventh shaft (7) and the seventh shaft (7) is connected to a carrier of the fourth planetary gear set (P4);
the sixth shaft (6) is connected to a ring gear of the first planetary gear set (P1) and a carrier of the second planetary gear set (P2);
a sun gear of the second planetary gear set (P2) is connected to the fourth shaft (4) which is connectable with the housing (G) via the second brake (04);
a ring gear of the third planetary gear set (P3) is continuously directly connected with the housing (G);
the output shaft (2) is continuously connected to a ring gear of the fourth planetary gear set (P4) and is releasably connectable, via the fourth clutch (28), to the eighth shaft (8) which is connected to a carrier of the third planetary gear set (P3); and
the first planetary gear set (P1) is blockable so as to rotate as a unit by engagement of the first clutch (13 or 36).

2. The multi step transmission according to claim 1, wherein the first clutch (13 or 36) releasably connects the third shaft (3) to the drive shaft (1).

3. The multi step transmission according to claim 2, wherein a first forward gear results from engagement of the second brake (04) and the second and the fourth clutches (35, 28);
a second forward gear results from engagement of the first, the second and the fourth clutches (13 or 36, 35, 28);
a third forward gear result from engagement of the second brake (04) and the first and the fourth clutches (13 or 36, 28);
a fourth forward gear results from engagement of the second brake (04) and the third and the fourth clutches (17, 28);
a fifth forward gear results from engagement of the second brake (04) and the first and the third clutches (13 or 36, 17);
a sixth forward gear results from engagement of the first, the second and the third clutches (13 or 36, 35, 17);
a seventh forward gear results from engagement of the second brake (04) and the second and the third clutches (35, 17);
an eighth forward gear results from engagement of the first brake (03) and the second and the third clutches (35, 17), and
a ninth forward gear results from engagement of the first and the second brakes (03, 04) and the third clutch (17); and
the reverse gear results from engagement of the first and the second brakes (03, 04) and the fourth clutch (28).

4. The multi step transmission according to claim 1, wherein the first, the second, the third and the fourth planetary gear sets (P1, P2, P3, P4) are minus planetary gear sets.

5. The multi step transmission according to claim 1, wherein the first clutch (13 or 36) releasably connects the third shaft (3) with the sixth shaft (6).

6. The multi step transmission according to claim 5, wherein a first forward gear results from engagement of the second brake (04) and the second and the fourth clutches (35, 28);
a second forward gear results from engagement of the first, the second and the fourth clutches (13 or 36, 35, 28);
a third forward gear result from engagement of the second brake (04) and the first and the fourth clutches (13 or 36, 28);
a fourth forward gear results from engagement of the second brake (04) and the third and the fourth clutches (17, 28);
a fifth forward gear results from engagement of the second brake (04) and the first and the third clutches (13 or 36, 17);
a sixth forward gear results from engagement of the first, the second and the third clutches (13 or 36, 35, 17);
a seventh forward gear results from engagement of the second brake (04) and the second and the third clutches (35, 17);
an eighth forward gear results from engagement of the first brake (03) and the second and the third clutches (35, 17), and
a ninth forward gear results from engagement of the first and the second brakes (03, 04) and the third clutch (17); and
the reverse gear results from engagement of the first and the second brakes (03, 04) and the fourth clutch (28).

\* \* \* \* \*